United States Patent [19]
Smith

[11] Patent Number: 5,105,179
[45] Date of Patent: Apr. 14, 1992

[54] ELECTRONIC DISPLAY LICENSE PLATE

[76] Inventor: J. Wise Smith, 1507 W. Massey, Memphis, Tenn. 38119

[21] Appl. No.: 544,932

[22] Filed: Jun. 28, 1990

[51] Int. Cl.$^5$ ............................................. B60Q 1/26
[52] U.S. Cl. ................................. 340/468; 340/461; 340/462; 340/815.01
[58] Field of Search ............................. 340/468–473, 340/463, 464, 479, 485, 723, 724, 789, 790, 461, 462, 815.01; 40/910; 364/424.01, 424.03

[56] References Cited

U.S. PATENT DOCUMENTS

| | | | |
|---|---|---|---|
| 1,376,220 | 4/1921 | Needham . | |
| 1,970,080 | 8/1934 | Edgerton . | |
| 2,122,027 | 6/1938 | Czarny et al. | 40/133 |
| 2,131,962 | 10/1938 | McAlpin . | |
| 2,559,163 | 7/1951 | Macdonald . | |
| 3,678,457 | 7/1972 | Lev . | |
| 4,361,828 | 11/1982 | Hose . | |
| 4,457,089 | 7/1984 | Phillips, Jr. | 40/544 |
| 4,868,542 | 9/1989 | Thompson | 340/468 |
| 4,928,084 | 5/1990 | Reiser | 340/479 |

*Primary Examiner*—Donnie L. Crosland
*Attorney, Agent, or Firm*—Walker & McKenzie

[57] ABSTRACT

An electronic display license plate and message center for use on automobiles and other vehicles. The electronic display license plate is a replacement for the standard metal license plate, and may be constructed as a part of the car, such as an integral part of the taillight assembly, or may be constructed as a bolt-on replacement module for existing license plates. The display may be constructed from an array of light-emitting diodes, or a liquid crystal display, or from an electroluminescent panel. A configuration cartridge, typically containing a read only memory (ROM) circuit, contains license plate information such as state, county, license number, and expiration date, configures the display for the particular vehicle. The electronic display license plate may also contain circuitry to detect the expiration of the license and appropriately indicate that expiration by flashing or inverting the display, or causing it to go blank.

16 Claims, 17 Drawing Sheets

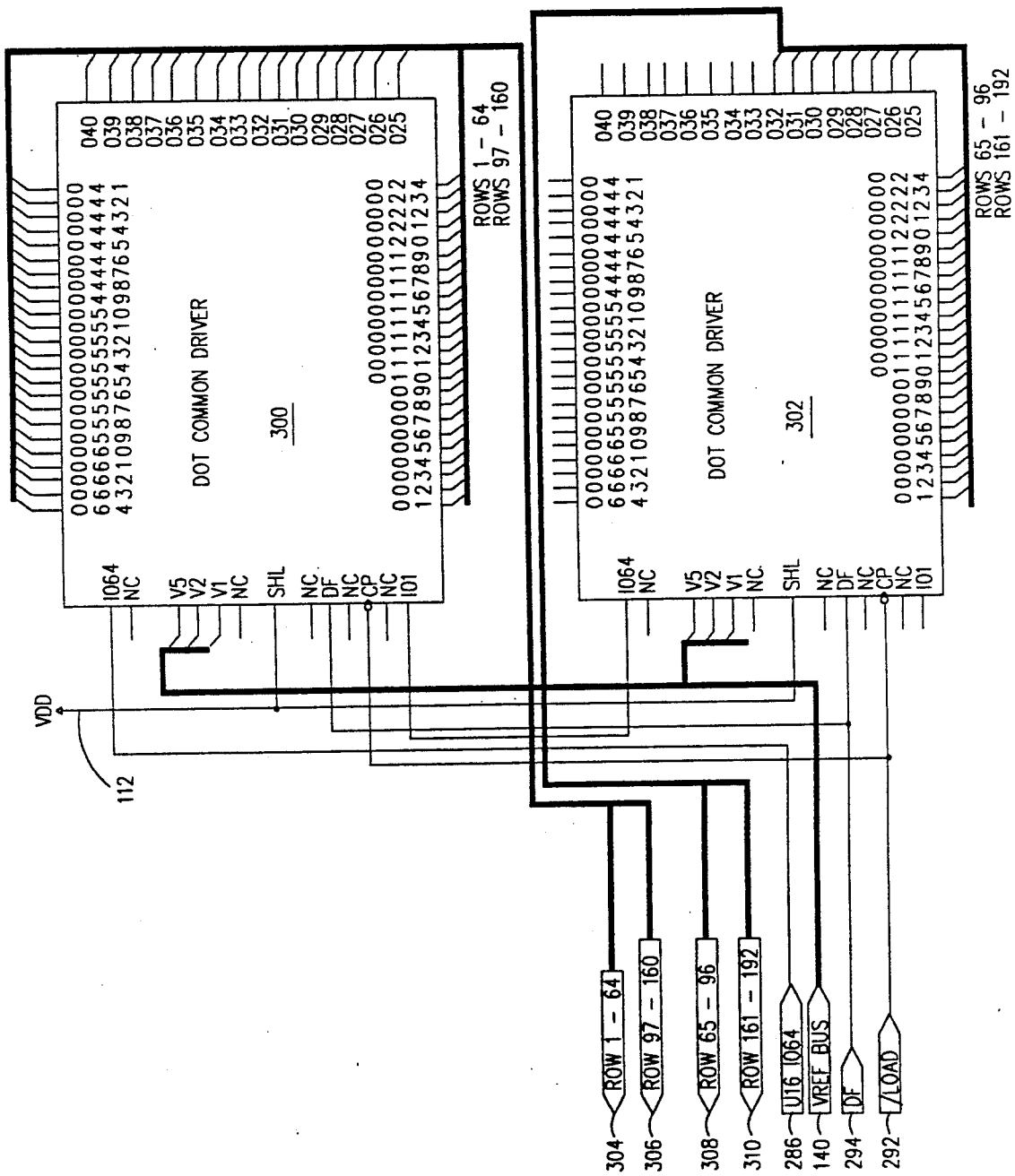

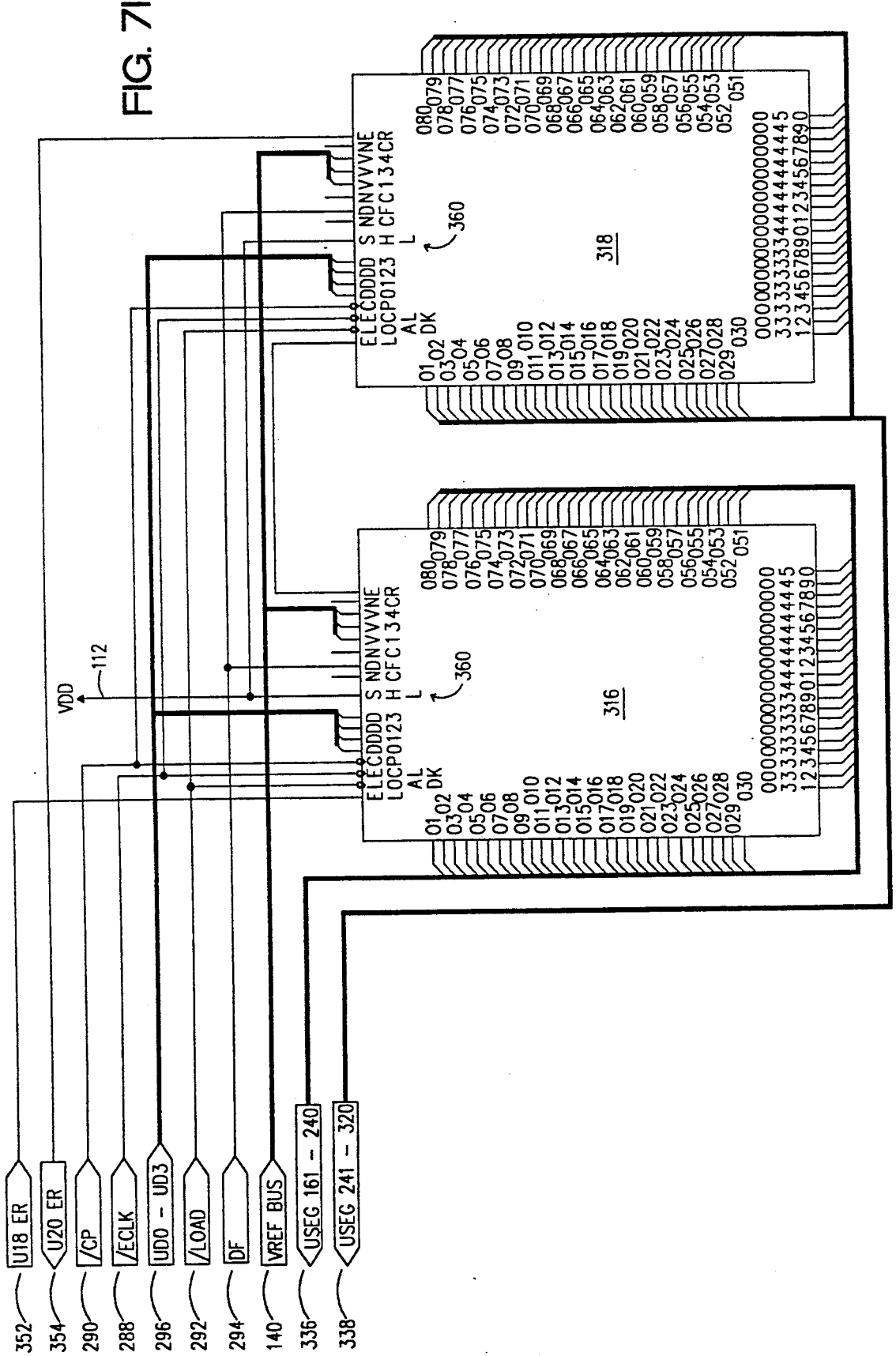

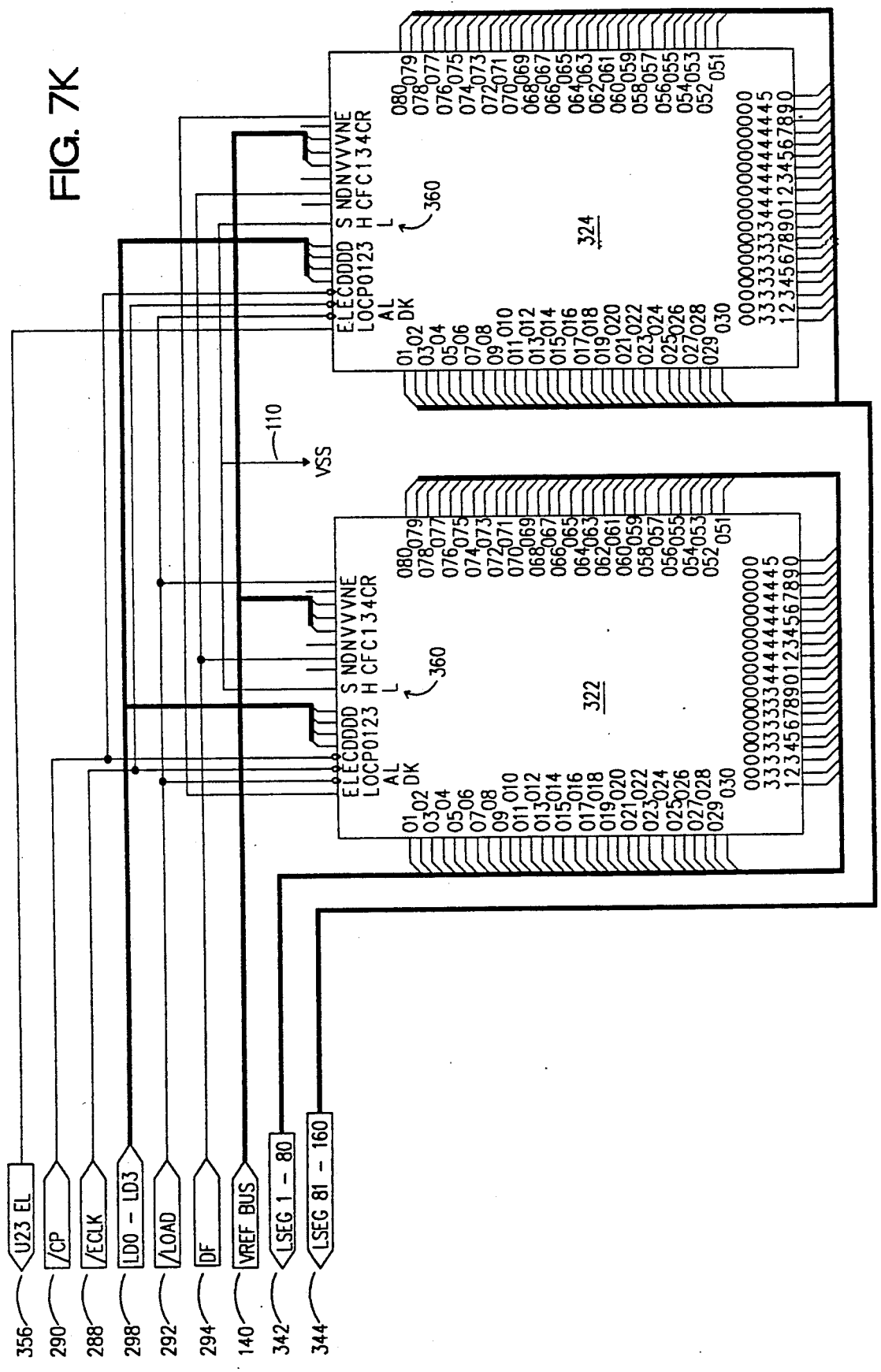

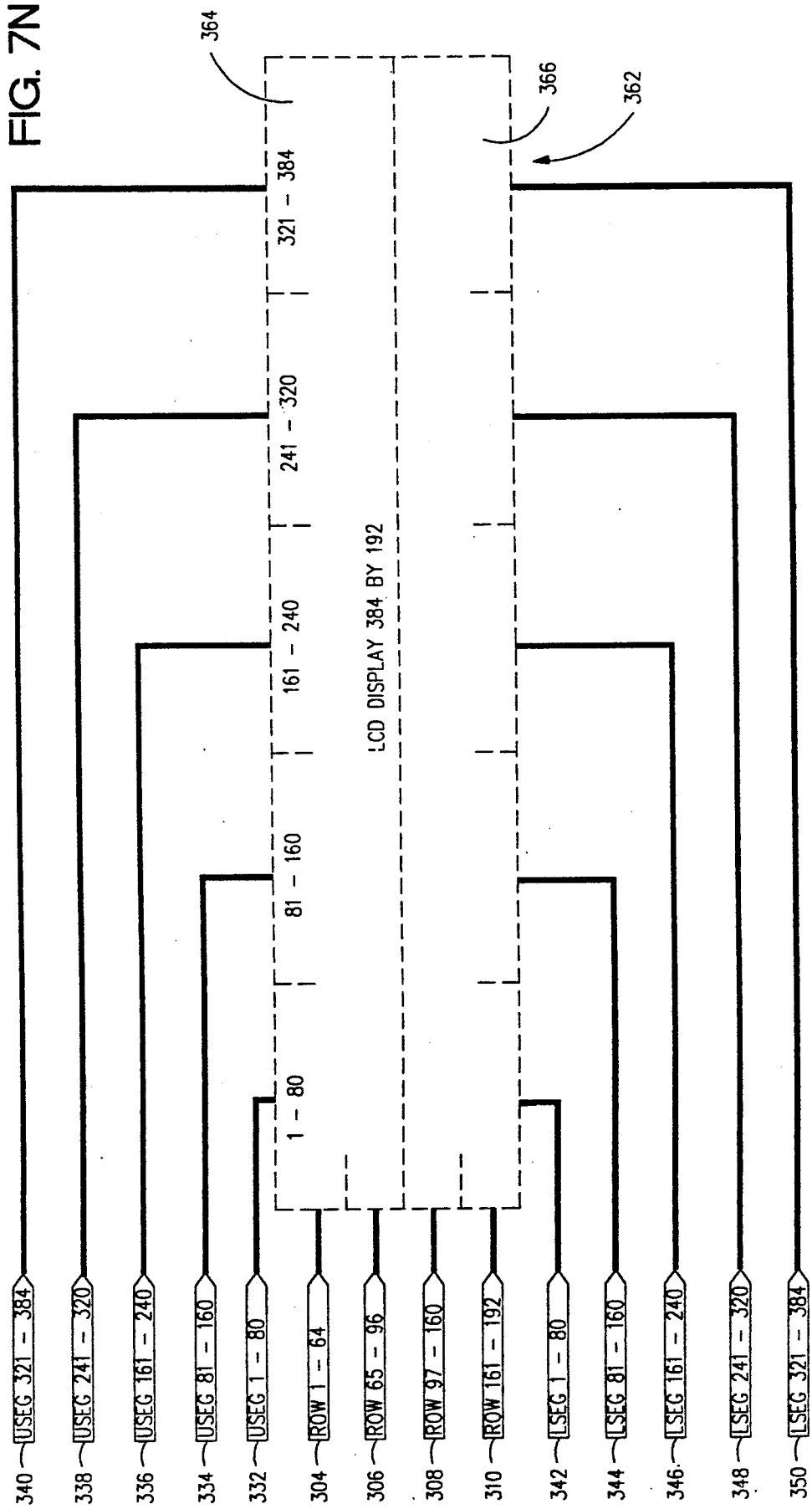

ELECTRONIC DISPLAY LICENSE PLATE

BACKGROUND OF THE INVENTION

1. Field of the Invention

The present invention relates, in general, to automotive display devices, and in particular, to an electronic display license plate and message center device for mounting upon, or inclusion as an integral part of, automobiles and other vehicles.

2. Information Disclosure Statement

A preliminary patentability search of the prior art produced the following patents: Needham, U.S. Pat. No. 1,376,220; Edgerton, U.S. Pat. No. 1,970,080; Czarny et al., U.S. Pat. No. 2,122,027; McAlpin, U.S. Pat. No. 2,131,962; Macdonald, U.S. Pat. No. 2,559,163; Lev, U.S. Pat. No. 3,678,457; Hose, U.S. Pat. No. 4,361,828; and Phillips, Jr., U.S. Pat. No. 4,457,089. While each of the above patents discloses various display apparatus for use with automobiles and other vehicles, none disclose or suggest the present invention. More specifically, none of the above patents disclose or suggest an electronic display license plate and message center for mounting upon, or inclusion as an integral part of, automobiles and other vehicles, in which the license plate itself is composed of a configurable electronic display.

Needham, U.S. Pat. No. 1,376,220, describes an illuminated license plate in which light bulbs may be arranged in the shape of the numerals of the license. Unlike the present invention, the Needham patent has sockets for the lamps secured within the cover, and is not configurable or adaptable to the variety of license numbers once the light bulbs have been constructed in the shape of the numerals for a particular license.

Edgerton, U.S. Pat. No. 1,970,080, describes an automotive signal device in which a compartmentalized box is covered by a lid having a series of openings shaped in the form of various symbols and words, where the lid also has a large opening for receipt of a license plate having similar openings in the position of the numerals. Lamps within the box shine through the various openings fabricated in the lid and the license plate. McAlpin, U.S. Pat. No. 2,131,962, describes a compartmentalized box which serves as a combination license plate and direction signal for motor vehicles, having a license plate with openings shaped in the form of letters. Similarly, Czarny et al., U.S. Pat. No. 2,122,027, describes an illuminated license plate taillight, in which a license plate with openings in the appropriate positions for its numerals is illuminated from behind by a lamp. The present invention has no such openings fabricated in its surface for display, and is configurable to easily adapt to required license information without requiring the fabrication of such openings.

Macdonald, U.S. Pat. No. 2,559,163, describes a license plate and signalling unit for mounting upon the roof of a vehicle, which houses and illuminates a standard license plate, as well as providing for directional signals mounted in the periphery of the unit. The present invention requires no standard license plate, and, in fact, replaces the standard license plate.

Lev, U.S. Pat. No. 3,678,457, describes a compartmentalized message box with a translucent-opaque cover containing a variety of words, one over each compartment, which may be appropriately illuminated, under control of the driver of the vehicle. Unlike the present invention, the Lev patent does not contain license plate information, and is not configurable, being restricted to those words placed upon the cover at manufacture.

Hose, U.S. Pat. No. 4,361,828, describes an opto-electrical message display unit for use with automobiles, enabling the driver to display a variety of messages from a control unit within the vehicle. Phillips, Jr., U.S. Pat. No. 4,457,089, describes a decorative, illuminated, automotive display panel which may be used to display automotive insignia. Neither the Hose patent nor the Phillips patent replaces a standard license plate, as does the present invention.

SUMMARY OF THE INVENTION

For many years, cars, trucks, and other vehicles have been required to have license plates, signifying proper registration of those vehicles with the appropriate governmental agency. These license plates historically have been fabricated from metal, are subject to theft, and clash with the aesthetics of modern styling used on newer cars.

The present invention is an electronic replacement for the license plates and associated renewal stickers mandated for most vehicles, comprising an electronic display and means for configuring the display for the particular license plate information required by the vehicle having the display. It will be understood that the terms "vehicle" and "car", as used herein, refer to any vehicles required to display and have license plates, such as cars, trucks, trailers, and the like. The present invention, being an electronic replacement for the metal license plate and associated renewal stickers, can be constructed integrally with the rear taillight assembly of the vehicle, giving a more pleasing appearance in harmony with the trend toward futuristic styling, and is not subject to theft, as are present license plates. The present invention can also be constructed as a bolt-on replacement for license plates on existing older cars, and may include means for detecting the removal of the electronic license plate replacement and disabling the license plate display upon such removal thus also discouraging theft on older vehicles.

It is an object of the present invention to provide a secure configuration means to configure the electronic license plate for the particular vehicle on which it is to be used, resistant to tampering and theft, allowing governmental agencies to retain control over the licensing process by issuing the configuration means, properly tailored to the particular vehicle, to the owner of the vehicle upon payment of the proper registration fee. The owner, at the time of registration and possibly for an additional fee, may also request that the issuing agency further tailor the configuration means so that the present invention may display a slogan or motto, enabling the apparatus to be used as a "message center" in addition to its function as a license plate.

It is a further object of the present invention to provide means for detecting the expiration of the particular license and indicating this expiration on the display, for observation by law enforcement authorities.

BRIEF DESCRIPTION OF THE DRAWINGS

FIG. 7A, 7B, 7C, 7D, 7E, 7F, 7G, 7H, 7I, 7J, 7K, 7L, 7M, and 7N, taken together, are the detailed schematic for the circuitry of a possible embodiment of the present invention.

DESCRIPTION OF THE PREFERRED EMBODIMENT

Figure 1:
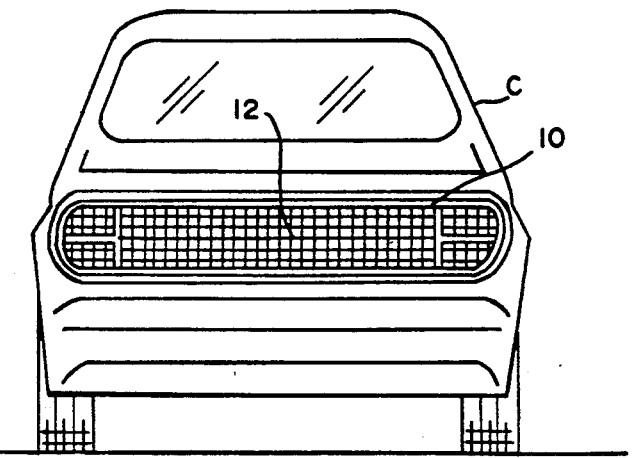
FIG. 1 is a rear view of an automobile with an electronic display license plate as an integral part of the rear tail light assembly.
Figure 2:
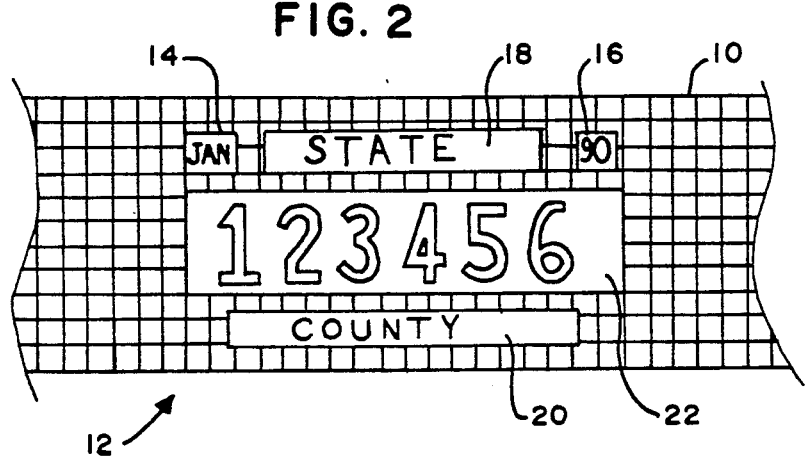
FIG. 2 is a view of a portion of the rear tail light assembly of FIG. 1, showing the electronic display license plate viewing area.

Referring to FIG. 1, a rear view of a oar C is shown, having a taillight assembly 10 with an electronic display license plate viewing area 12 located therein as shown. FIG. 2 shows a portion of taillight assembly 10, and electronic display license plate viewing area 12 is seen to comprise expiration month and year display areas 14 and 16, respectively, state and county display areas 18 and 20, respectively, and a license number display area 22, each showing the typical license information mandated by the appropriate governmental agencies. In the embodiment of the present invention shown in FIG. 1, 2, and 3, electronic display license plate viewing area 12 can be seen to be integrated within taillight assembly 10, which extends substantially across the rear of car C, providing an aesthetically pleasing appearance, unbroken by a mounting area for a traditional license plate.

Figure 3:
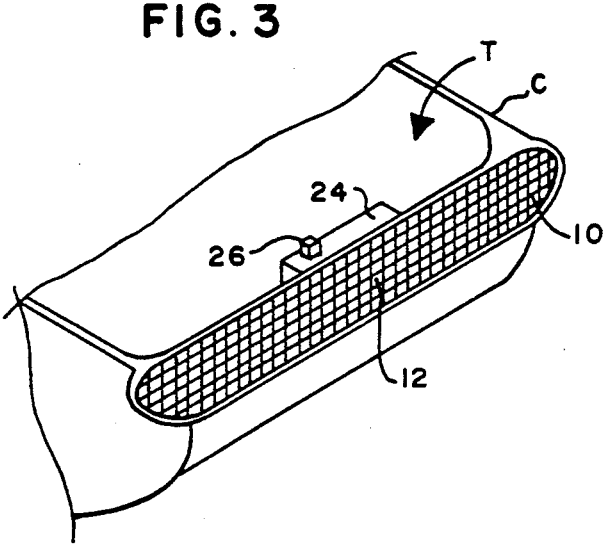
FIG. 3 is a view of the trunk compartment and rear of an automobile with the electronic display license plate, showing the display module mounted behind the rear tail light assembly within the trunk compartment.

Referring to FIG. 3, electronic display license plate display module 24 can be seen mounted within trunk compartment T of car C, substantially behind viewing area 12 of taillight assembly 10. Configuration cartridge 26, described below, can be seen to be accessible from within trunk compartment T, but is understood to be inaccessible when the trunk lid, not shown, is closed, preventing access to trunk compartment T. This restricted access prevents theft of or unauthorized tampering with display module 24 or configuration cartridge 26, as will now be readily apparent.

Figure 4:
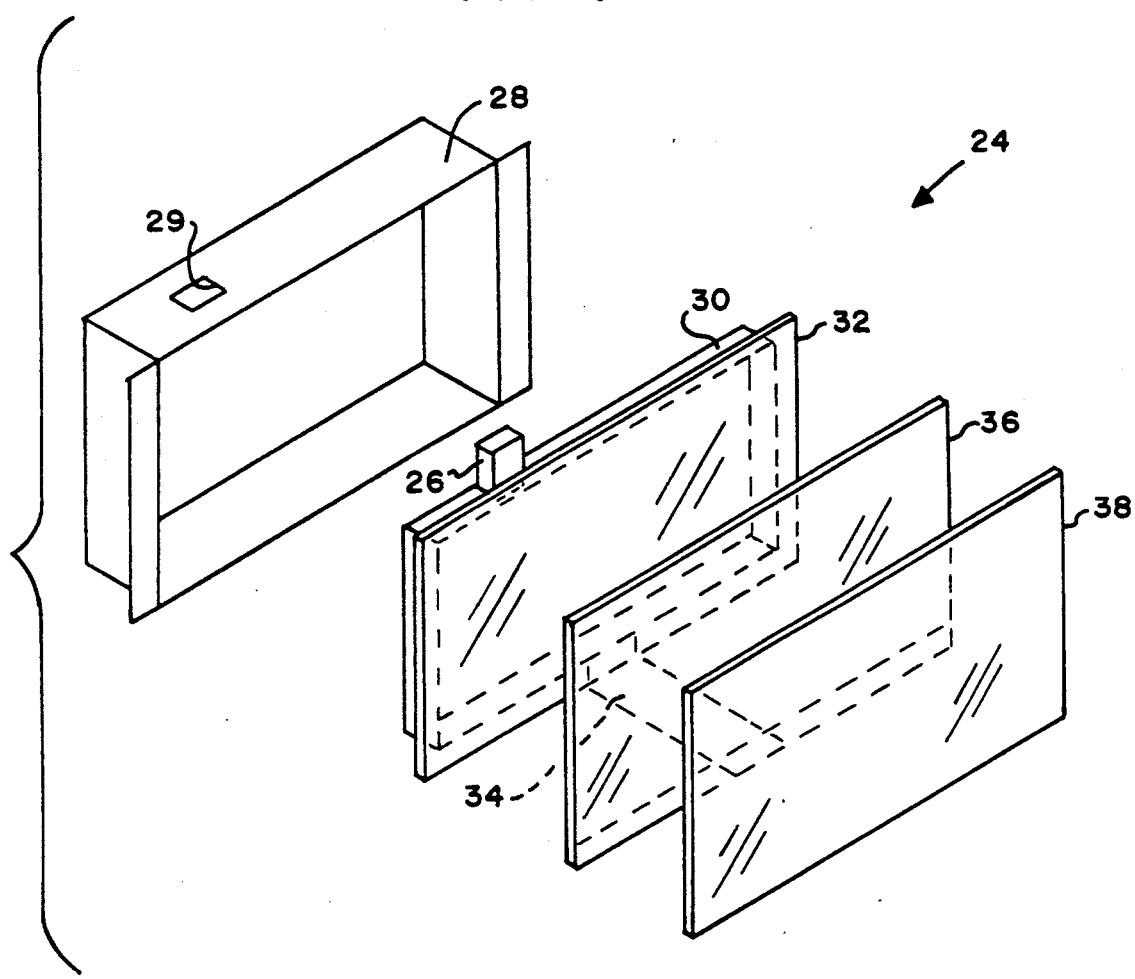
FIG. 4 is an exploded view of the electronic display license plate display module, showing the various components.

Referring to FIG. 4, the major components comprising the electronic display license plate 24 can be observed. Display panel 36, which may be implemented by a variety of technologies, well known to those skilled in the art, such as an array of light-emitting diodes (LEDs), an electroluminescent panel, or preferably, as shown in FIG. 4, a liquid crystal display (LCD) panel, preferably of the "super twist" "low temperature" variety employing an ultraviolet screen on the front to prevent degradation of the display in sunlight, in a manner well known to those skilled in the art. Display panel 36 is controlled by electronic display control circuitry 30, connected to display panel 36 through wiring harness 34. Back lighting panel 32 may be provided when display panel 36 is implemented by means of a liquid crystal display, as shown, in a manner well known to those skilled in the art, to shine through panel 26 to produce numerals and letters that may be easily observed. Preferably, the illumination from back lighting panel 32 will come from an array of high brightness GaAlAs LEDs, typically five candelas in brightness each, allowing the information from electronic display license plate 24 to be observed in full sunlight. Alternatively, if display panel 36 is comprised not of an LCD panel, but of an array of LEDs, those LEDs will be chosen to be high brightness GaAlAs LEDs, preferably five candelas each, arranged in a matrix sufficiently dense to display the information shown in FIG. 2. In either embodiment of display panel 36, whether implemented by LCD technology or an LED array, electronic circuitry 30 will also preferably have ambient light sensing circuitry (not shown in FIG. 4) to brighten or dim the display, as required by the ambient light viewing conditions, to conserve power and prolong the life of the LEDs, in a manner well known to those skilled in the art.

Translucent cover 38 and housing 28 act to protect display panel 36, back lighting panel 32 and electronic circuitry 30 from moisture and physical abuse. Also, housing 28 has an access opening 29 through which configuration cartridge 26, hereinafter described, may be inserted into and removed from circuitry 30.

It is the intent of the present invention that the electronic display license plate, with the exception of configuration cartridge 26, be designed to be installed during manufacture of the automobile with the rest of taillight assembly 10, as shown in FIG. 3. The purchaser of the car, or its subsequent owner, would go to the appropriate governmental agency and, upon payment of the appropriate registration and license fee, would be issued a configuration cartridge, such as configuration cartridge 26, tailored to the particular vehicle and registration information. Configuration cartridge 26 preferably will comprise a read-only memory (ROM) integrated circuit, well known to those skilled in the art, and will be programmed to include such information as the license number, the state, county, year and month of expiration, the vehicle identification number (VIN) of the automobile, and may also include such information as a code identifying the agency at which the configuration cartridge was issued, the date of issue, and the owner's name and address. For a fee, the agency might also allow the insertion of a slogan or motto that could be displayed in a suitable area (not shown in FIG. 2) of license plate display viewing area 12, enabling the apparatus to be used as a "message center" in addition to its function as a license plate. The owner, after purchasing the configuration cartridge, would then insert it into the electronic display license plate display module 24, as shown in FIG. 3 and 4. The electronic control circuitry 30 within the electronic display license plate will be manufactured to contain the vehicle identification number (VIN) information for the particular vehicle, as well as circuitry to compare the actual VIN against the VIN encoded within the configuration cartridge. Upon successful comparison, the electronic display license plate will activate the display, retrieve the license plate information from the configuration cartridge, and display the information contained therein upon the display. Alternatively, configuration cartridge 26 may have reserved a number of "unprogrammed locations" within the ROM therein, and control circuitry 30 may have means for interrogating the ROM, determining that the "unprogrammed locations" do not yet contain valid data (the condition when the ROM is first installed), and then programming the ROM to contain a special unique serial number placed within control circuitry 30 at manufacture. This special unique serial number can then be verified in a manner similar to that used above with the VIN number verification, to prohibit theft of configuration cartridge 26 and subsequent installation in another license plate display, as will now be apparent.

Additionally, configuration cartridge 26 may contain circuitry to detect the expiration of the license, and electronic display license plate control circuitry 30 could cause the license display to indicate this expiration by, for instance, flashing the display, displaying the characters in the display in inverse video, or even going blank, as desired by the appropriate governmental agency. Such circuitry could be implemented, for instance, by the usual battery-backed up clock circuit within the configuration cartridge, able to be interrogated by the electronic display license plate control circuitry, in a manner well known to those skilled in the art. Due to the low cost of read-only memory integrated circuits, it is foreseeable that configuration cartridge 26 could be manufactured more cheaply than the present metal license plates now in use.

In a variation of the present invention, this configuration cartridge could easily be located within the engine compartment, within the glove compartment, on the vehicle's fuse panel, or any other suitable location, as required by security and other considerations.

Figure 5:
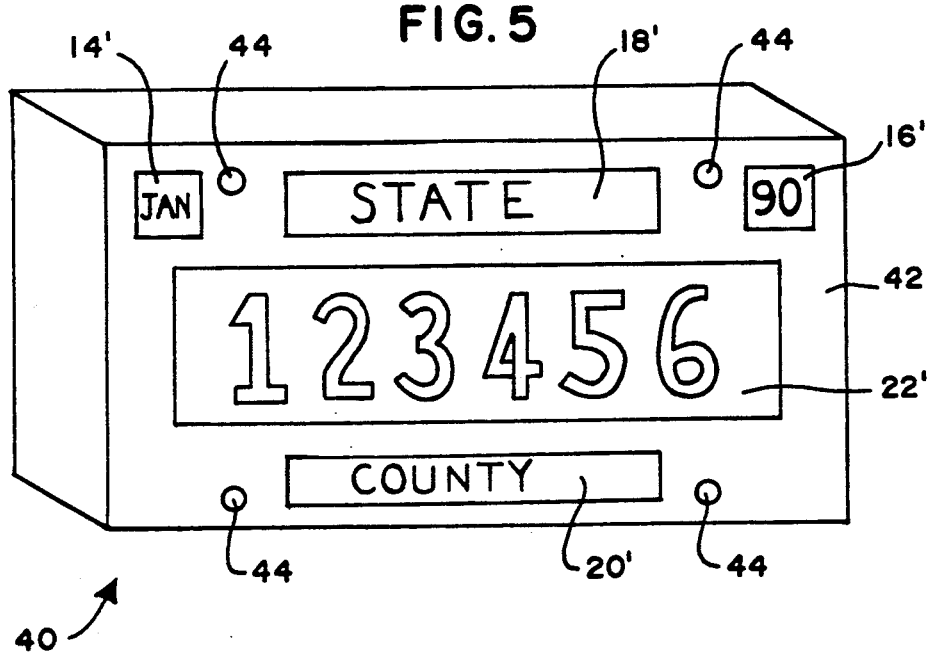
FIG. 5 is a view of one variation of the electronic display license plate, designed as a direct replacement for a conventional license plate.

During the transition period from the present, where all vehicles use metal license plates, to the future, when all vehicles use electronic display license plates, there will be a need for an electronic display license plate that is not constructed integrally with the rear taillight assembly, as shown in FIG. 1, 2, and 3, but that may be retrofitted onto older vehicles, and yet still use the configuration cartridges that will be issued by governmental agencies. To meet this need, a variation of the present invention is shown in FIG. 5, showing an electronic display license plate replacement module 40, having a housing 42 that is substantially the same height and width as a present metal license plate, and with mounting holes 44 located in substantially the same places as those on present metal license plates. Housing 42 will necessarily have a slightly greater thickness than the present metal license plates, in order to accommodate the electronics and display panels of the electronic display license plate. In a manner similar to that shown in FIG. 2, FIG. 5 shows that replacement module 40 has a display comprising expiration month and year display areas 14' and 16', respectively, state and county display areas 18' and 20', respectively, and a license number display are 22'.

Figure 6:
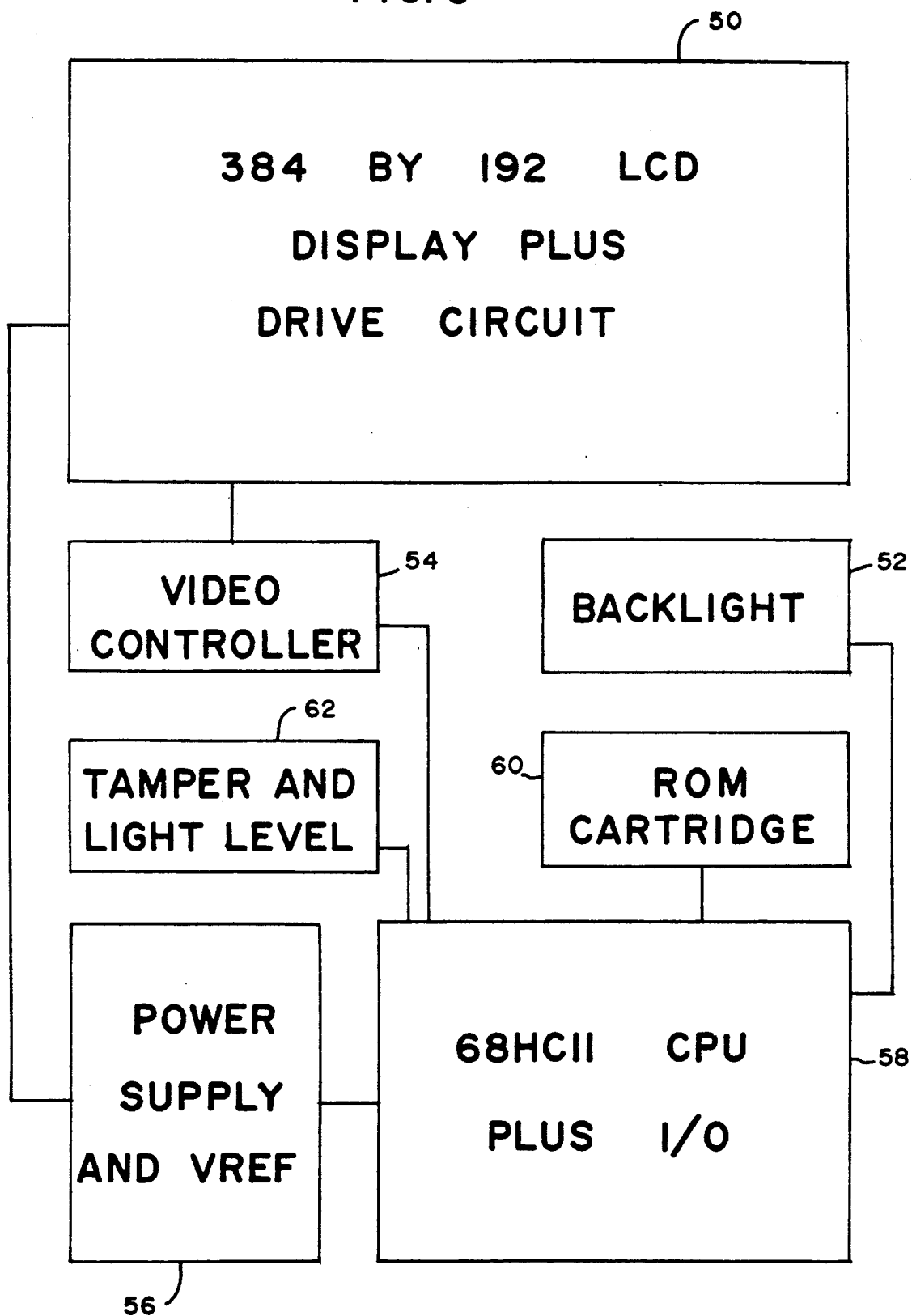
FIG. 6 is a block diagram of the circuitry for a possible embodiment of the electronic display license plate, showing the various architectural components.
Figure 7A:
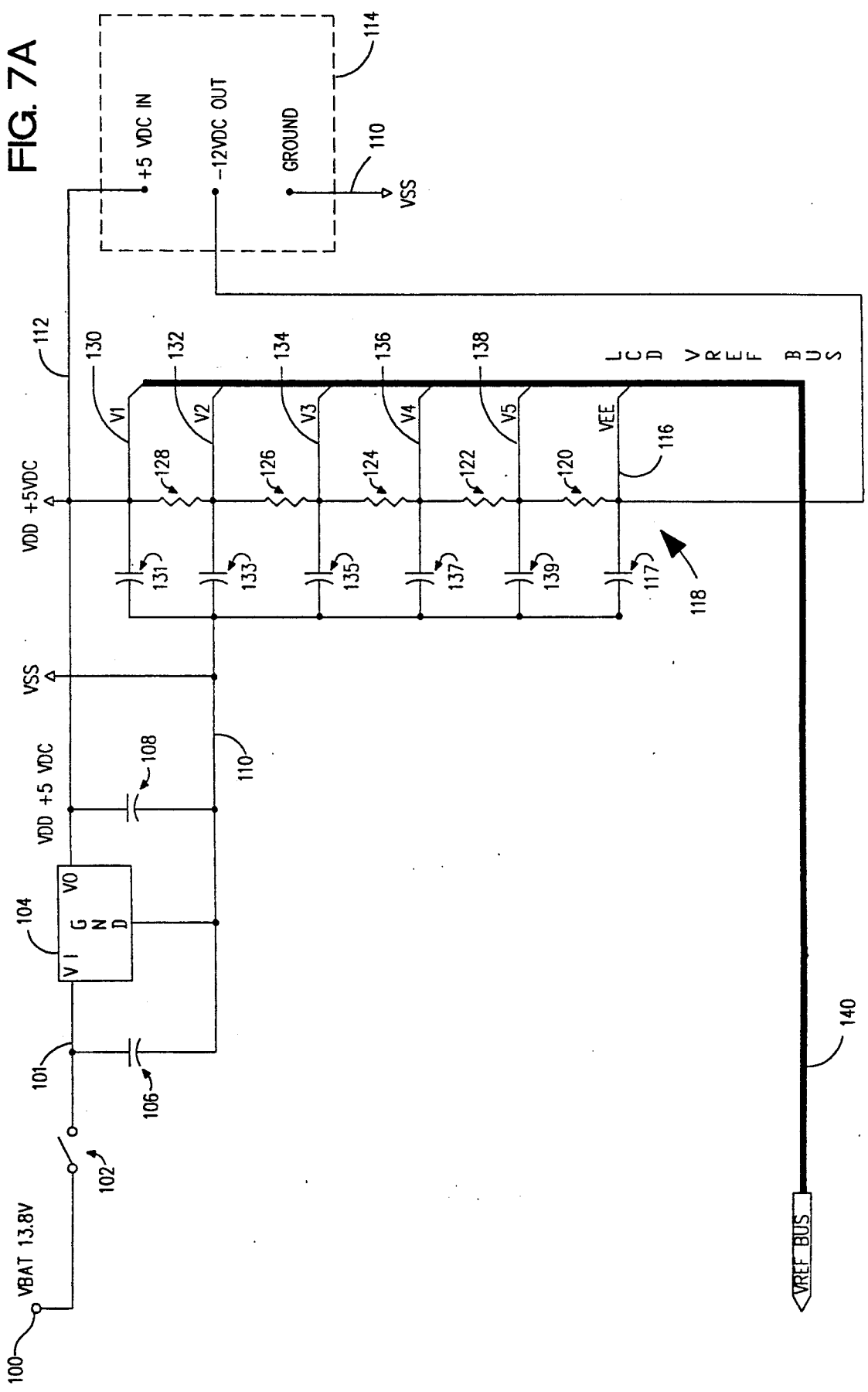

FIG. 6 shows a block diagram of one possible implementation of the electronic display license plate, whose detailed schematics are given in FIG. 7A - 7N. The preferred implementation shown has a liquid crystal display (LCD) panel with associated drive circuitry, shown as block 50, which is backlit by an array of light emitting diodes (LEDs), represented by block 52. LCD display 50 is controlled by video controller 54, and supplied with power by power supply and voltage reference element 56. A microprocessor central processing unit (CPU) 58 controls the operation of the electronic display license plate, reading license plate information from a configuration cartridge, such as read-only memory (ROM) cartridge 60, and controlling video controller 54. CPU 58 also senses the ambient light level detected by sensing circuitry 62, and appropriately adjusts the illumination level of LED backlight array 52, in a manner that will be hereinafter described. Sensing circuitry 62 also comprises means to detect the removal of the electronic license plate from a vehicle, and allows CPU 58 to disable the display if, for instance, the electronic license plate is removed, perhaps by theft.

It should be understood that many of the discrete logic elements of the detailed implementation herein described may be combined for ease of manufacture and cost reduction purposes to be implemented by means of programmable array logic (PAL) devices, application specific integrated circuits (ASICs), or similar devices, in a manner well known to those skilled in the art, without departing from the scope of the present invention.

FIG. 7A shows the power supply circuitry for the electronic display license plate, as well as the circuitry to generate the necessary reference voltages for the LCD panel. External power from the vehicle, typically 13.8 Volts, is applied through terminal 100 and interlock switch 102, creating a 13.6 Volt potential at node 101, and is transformed to the 5.0 Volts required by the display electronics by voltage regulator 104, typically chosen to be an LM7805 regulator, bypassed by capacitors 106 and 108, typically 100 uF and 0.01 uF, respectively. Signal 110, designated as VSS on the schematic, is used as the ground reference throughout the schematic, while signal 112, designated as VDD, is used as the +5.0 Volt (nominal) supply potential. The 5.0 Volt power is converted by converter module 114, such as one manufactured by the Burr-Brown Company, to −12.0 Volts, signal 116, designated as VEE, for application to resistor network 118, for generation of the requisite supply voltages needed by the LCD circuitry. Resistor network 118 comprises resistors 120, 122, 126, and 128, each typically 1K Ohms, as well as resistor 124, typically 6.8K generates supply voltages 130, 132, 134, 136, 138, and 116, designated as V1, V2, V3, V4, V5, and VEE, respectively, for the LCD circuitry shown in FIG. 7G through 7M, bundled together as voltage reference bus (VREF BUS) 140. Each of supply voltages 130 (V1), 132 (V2), 134 (V3), 136 (V4), 138 (V5), and 116 (VEE) is decoupled to ground reference signal 110 (VSS) by bypass capacitors 131, 133, 135, 137, 139, and 117, each typically 3.3 uF, as shown in FIG. 7A.

Figure 7B:
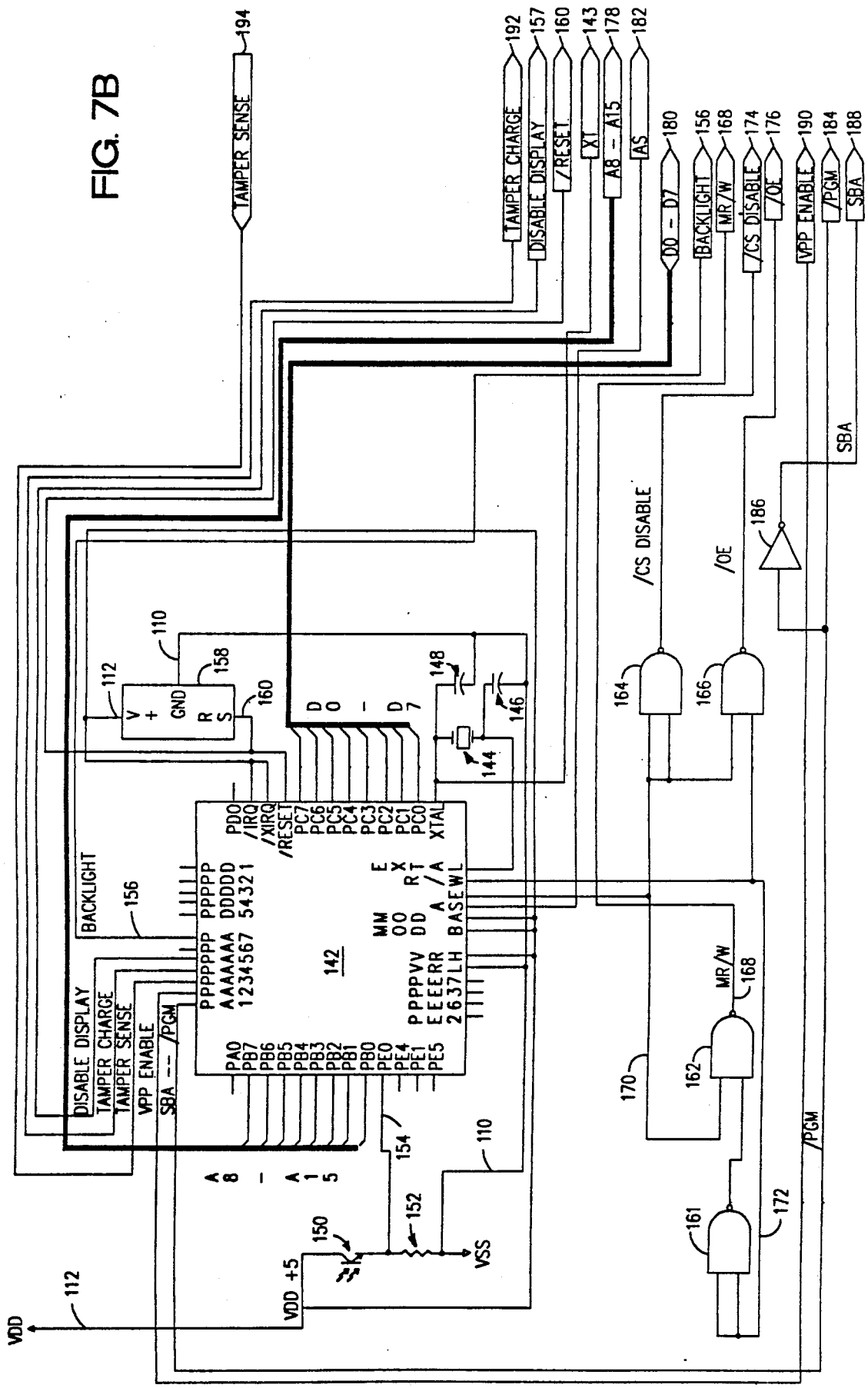

FIG. 7B shows the CPU and I/O control pins. CPU 142, preferably a Motorola 68HC11A8, whose characteristics are well known to those skilled in the art, controls the operation of the electronic license plate display. It preferably operates at a clock rate of 2.464 MHz, supplied on signal 143 (XT), as determined by crystal 144 and capacitors 146 and 148, each typically 20 pF. Phototransistor 150, with load resistor 152, typically 1K Ohm, senses the ambient light levels, and applies a reference voltage to CPU 142 through analog input 154, where it is then digitized for use by CPU 142, so that the brightness of the display may be adjusted by signal 156 (BACKLIGHT), which is an asymmetrical square wave derived from an internal counter within CPU 142, whose duty cycle determines the brightness of the LED backlight. CPU 142 generates, as one of its output signals under the control of executing software, signal 157 (DISABLE DISPLAY), which, when asserted high, will cause the electronic license plate display to become blanked. Power-on reset circuit 158, preferably a Motorola 8054HN circuit, generates reset signal 160 (/RESET, asserted low) to properly initialize CPU 142 upon application of power to the electronic license plate electronics.

NAND gates 161 and 162, each typically a 74LS00 gate, combine to generate signal 168 (MR/W) from signals 170 (E) and 172 (R/W) output by CPU 142. Signal 168 (MR/W) is at a high level when CPU 142 is executing read cycles, and is asserted low when CPU 142 is executing write cycles, in a manner well known to those skilled in the art. Similarly, NAND gates 164 and 166, each typically a 74LS00 gate, generate signals 174 (/CS DISABLE) and signals 176 (/OE), respectively, from signals 170 (E) and 172 (R/W). Signal 174 (/CS DISABLE) is high only after upper address bus 178, carrying address lines 8 through 15, and multiplexed data bus 180 out of CPU 142 have stabilized. Signal 176 (/OE) is asserted low during read cycles of CPU 142, and is high during write cycles. Signal 182 (AS) is an output signal from CPU 142 which is used to demultiplex the lower eight bits of address from multiplexed data bus 180, in the customary manner.

CPU 142 is also used to generate signal 184 (/PGM), which is asserted low when programming the image ROM, hereinafter described. Signal 184 (/PGM), inverted through inverter 186, typically a 7406 gate, generates signal 188 (SBA), which is used to control address and data latches in FIG. 7E, also when programming the image ROM. Similarly, CPU 142 also generates signal 190 (VPP ENABLE), asserted high, which is used in FIG. 7D to generate the programming voltage for the image ROMs.

Figure 7C:
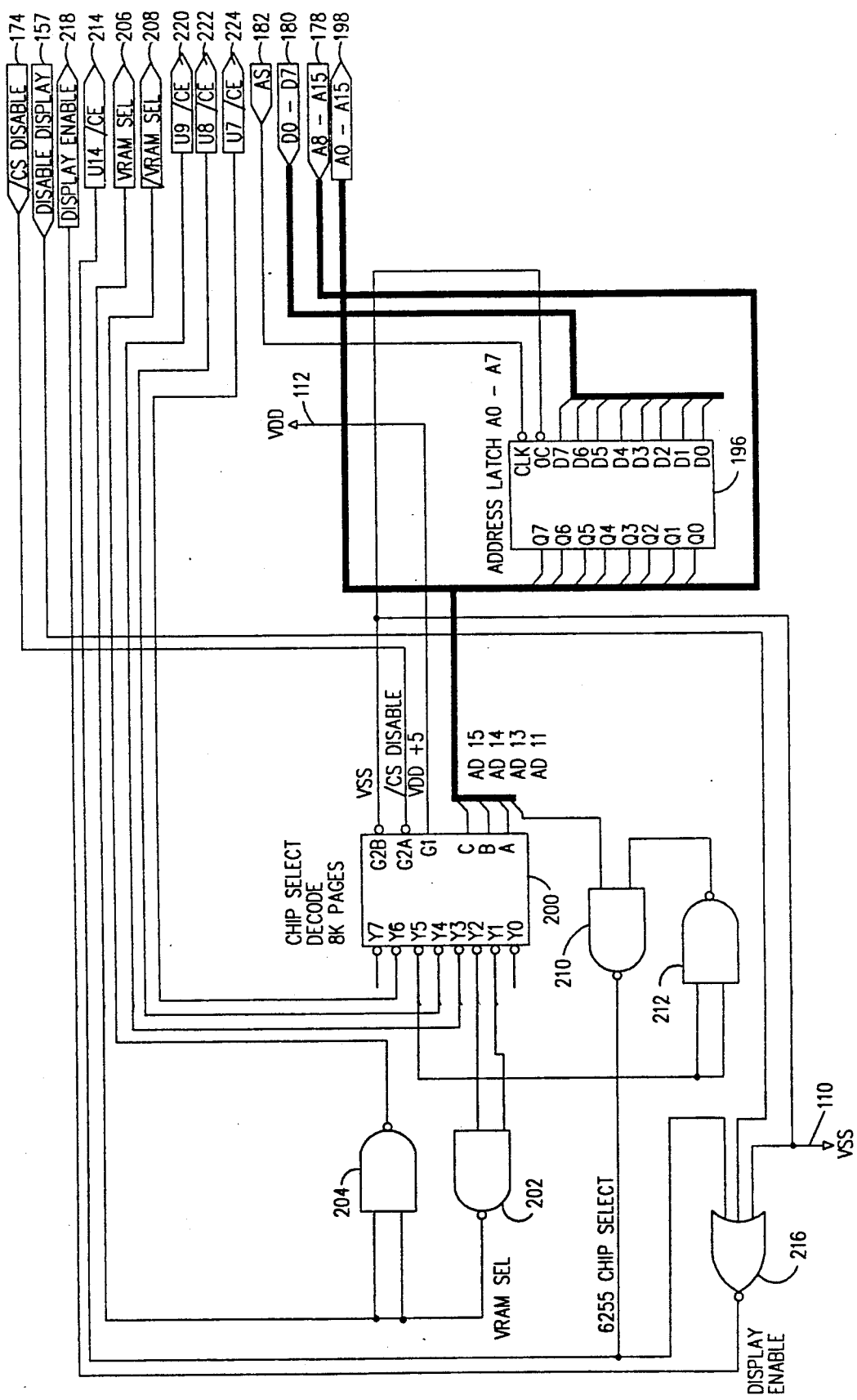
Figure 7D:
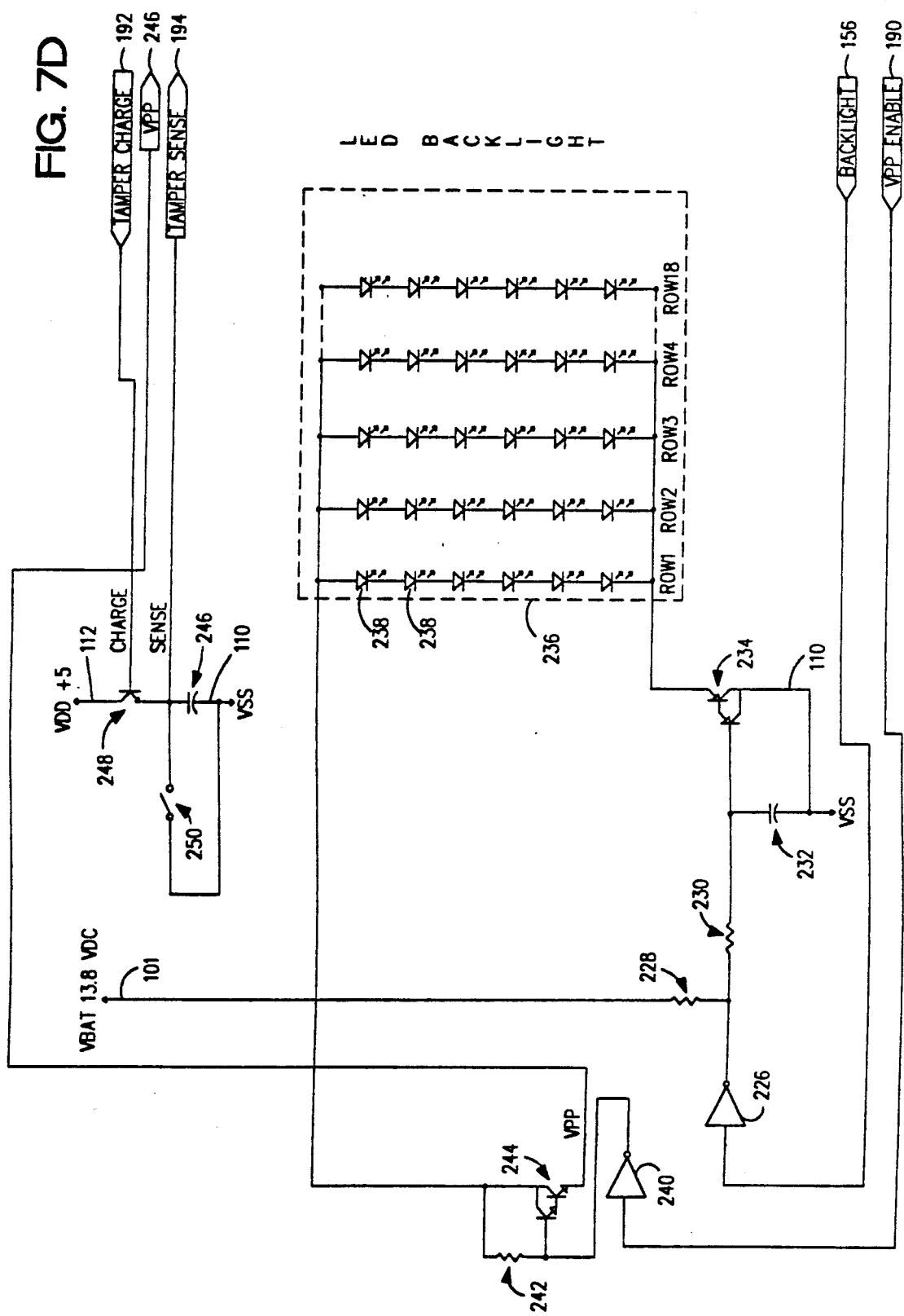

Signals 192 (TAMPER CHARGE) and 194 (TAMPER SENSE), are part of a possible anti-theft mechanism, described with the circuitry in FIG. 7D. Signal 192 (TAMPER CHARGE) is an output from CPU 142, and drives a charging circuit in FIG. 7D. Signal 194 (TAMPER SENSE), input to CPU 142, senses the voltage level within the charging circuit, hereinafter described.

FIG. 7C shows circuitry to generate the various chip selects and to demultiplex the low eight bits of address from the multiplexed CPU data bus 180. Address latch 196, typically a 74LS374 latch, receives multiplexed data bus 180 and latches the lower eight bits of address at the proper time, i.e., the rising edge of signal 182 (AS), to derive the latched lower address bits, which are then bundled with upper address bus 178 to give address bus 198, which contains all sixteen address bits. Demultiplexer 200, typically a 74LS138 demultiplexer, is used to decode the various chip selects for the various areas of memory accessible to CPU 142, depending on the upper three address bits from address bus 198. Table 1, below, summarizes the memory map seen by CPU 142, as decoded by the circuitry in FIG. 7C. All addresses are shown in base 16 (hexadecimal).

TABLE 1

| Addresses | Memory region | Ref. No. | FIG. |
|---|---|---|---|
| E000 ... FFFF | CPU Internal ROM | 142 | 7B |
| C000 ... DFFF | Program ROM | 260 | 7E |
| B800 ... BFFF | Video Controller | 272 | 7F |
| B600 ... B7FF | CPU Internal EPROM | 142 | 7B |
| A000 ... B5FF | (unused) | | |
| 8000 ... 9FFF | Image ROM/Smartwatch | 256 | 7E |
| 6000 ... 7FFF | Programmable Image ROM | 254 | 7E |
| 4000 ... 5FFF | Video RAM | 280 | 7F |
| 2000 ... 3FFF | Video RAM | 278 | 7F |
| 0100 ... 1FFF | (unused) | | |
| 0000 ... 00FF | CPU Internal Stack | 142 | 7B |

NAND gate 202, typically a 74LS00 gate, generates signal 206 (VRAM SEL), which, when asserted high, signals that CPU 142 is accessing the Video RAM, address regions 2000 to 5FFF (hexadecimal). NAND gate 204, typically a 74LS00 gate, is used as an inverter to invert signal 206 (VRAM SEL) and generate signal 208 (/VRAM SEL), which is asserted low when the Video RAM is accessed. NAND gates 210 and 212, each typically a 74LS00, generate signal 214 (U14 /CE), which goes to FIG. 7F to enable LCD controller chip 272 when asserted low. NOR gate 216, typically a 74LS27, generates signal 218 (DISPLAY ENABLE), which is asserted high to control LCD controller chip 272, as hereinafter described. Demultiplexer 200 is seen to also directly generate chip select signals 220 (U9 /CE), 222 (U8 /CE) and 224 (U7 /CE), which go to the circuitry in FIG. 7E and are described along with that circuitry.

FIG. 7D illustrates the backlight, anti-tamper, and programming voltage generation circuitry. Square wave signal 156 (BACKLIGHT), having an asymmetric duty cycle as previously described, generated in FIG. 7B, is inverted by open-collector inverter 226, typically a 7406 inverter, and pullup resistor 228, typically 500 Ohms, then integrated by resistor 230, typically 500 Ohms, and capacitor 232, typically 47 uF, amplified by PNP power darlington transistor 234, and used to drive LED backlight array 236. Backlight array 236 is comprised of an array of high brightness LEDs, such as LEDs 238, each preferably five candela GaAlAs LEDs, allowing the electronic display license plate to be read in full sunlight conditions. Backlight array 236 shines through the LCD panel, hereinafter described, allowing characters displayed on the panel to be seen. Signal 156 (BACKLIGHT), integrated over its duty cycle in a manner previously described, controls the brightness of LED backlight array 236 in a manner that will now be apparent to those skilled in the art. The integration of signal 156 (BACKLIGHT) reduces the possibility that a "strobing" effect of backlight array 236 will detract from the readability of the license plate display.

Signal 190 (VPP ENABLE), from FIG. 7B, is amplified through open collector inverter 240, typically a 7406 inverter, pulled up to 13.6 Volt node 101 by pullup resistor 242, typically 500 Ohms, and then current amplified using NPN darlington transistor 244 to generate programming voltage 246 (VPP), in a manner that will now be apparent; voltage 246 (VPP) is used to program the programmable image ROM in FIG. 7E as hereinafter described.

FIG. 7D also shows a possible anti-theft mechanism for the electronic license plate display, comprising capacitor 246, typically 0.47 F, charged through transistor 248 by signal 192 (TAMPER CHARGE) from CPU 142, and shunted by tamper switch 250. Tamper switch 250, of the momentary contact variety, may be mounted on the rear surface of housing 42 in FIG. 5 in such a manner that it becomes opened and closed as the removable electronic license plate display is attached and removed from the vehicle, forcing capacitor 246 to discharge when switch 250 is closed, and allows CPU 142 to detect the removal of the license plate display from the vehicle by sensing the voltage across capacitor 246 through signal 194 (TAMPER SENSE), in a manner that will now be apparent to those skilled in the art.

Figure 7E:
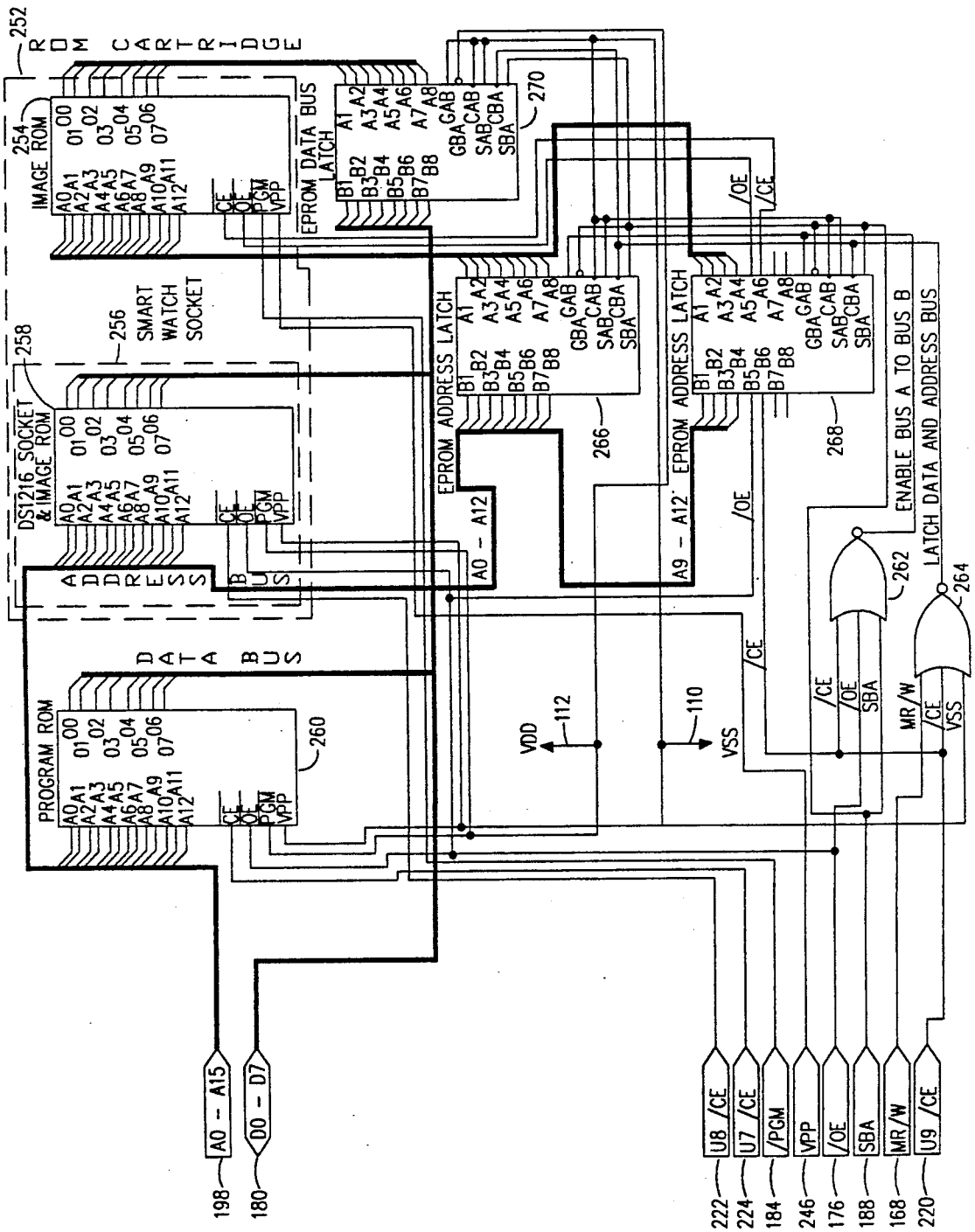

FIG. 7E shows the programmable ROMs used in the configuration cartridge and the software program ROM used by CPU 142 to execute its control program, as well as the associated latches and address circuitry.

Configuration cartridge circuitry 252, contained within configuration cartridge 26, comprises electrically programmable ROM (EPROM) 254, and socket 256. EPROM 254, typically a 2764 ROM, will contain the registration information for the particular vehicle, such as license number, state, county, year, and month, to be displayed upon the license plate display. This information may be retrieved by CPU 142 over data bus 180 in a manner that will be apparent to those skilled in the art. Socket 256 preferably contains a clock circuit, such as the DS1216 SmartWatch module, manufactured by Dallas Semiconductor and well known to those skilled in the art, having a compatible pin configuration with a 2764 memory chip, as well as another socket on the top of the SmartWatch module into which an additional image ROM, such as ROM 258, typically a 2764 ROM, may be installed. The DS1216 SmartWatch module contains a clock circuit, a lithium energy cell to maintain non-volatility of date information stored within the clock circuit, and appropriate control circuitry to allow access of the date information in a manner transparent to the access of the ROM or RAM plugged into the socket on the top of the SmartWatch module. Writing a preselected access pattern to the SmartWatch module enables the clock circuitry for reading or writing, while temporarily disabling access to the ROM or RAM plugged into the socket on the top of the module, in a manner well known to those skilled in the art. Interrogation of the DS1216 SmartWatch clock circuit allows CPU 142 to detect the expiration of the license and registration, as will now be apparent, and then appropriately alter the license plate display to indicate the expiration of the license. For example, CPU 142 could cause the display to flash, appear in inverse video, or possibly go totally blank, as required by the appropriate governmental agency.

ROM 258, which may plug into the socket on the top of the SmartWatch module, may contain additional license plate display information other than that contained within EPROM 254, as desired, and may be accessed by CPU 142 using address bus 198 and data bus 180 in a manner that will now be apparent to those skilled in the art.

Also shown in FIG. 7E is program ROM 260, typically a 2764 ROM, which contains the software program executed by CPU 142. Program ROM 260 is enabled by signal 224 (U7 /CE), generated in FIG. 7C, while the SmartWatch circuit or image ROM in socket 256 is enabled by signal 222 (U8 /CE), also generated in FIG. 7C, as appropriate, in the usual manner.

NOR gates 262 and 264, each typically a 74LS652 gate, along with address latch 266, typically a 74LS652 latch, latching the lower eight bits of address bus 198, and address latch 268, also a 74LS652 latch, latching address bits 9 through 12, together with data bus latch 270, typically a 74ALS652 latch, comprise a well known circuit enabling electrically programmable ROM 254 to be programmed under the control of CPU 142, using programming voltage 246 (VPP), signal 184 (/PGM), signal 220 (U9 /CE), signal 168 (MR/W), and 176 (/OE), as shown. Signal 188 (SBA) causes the addresses and data latched in latches 266, 268, and 270 to be applied to EPROM 254 for programming in the traditional manner. The desirability of having EPROM 254 be programmable by CPU 142 was previously described, and is part of the anti-theft detection and prevention scheme.

Figure 7F:
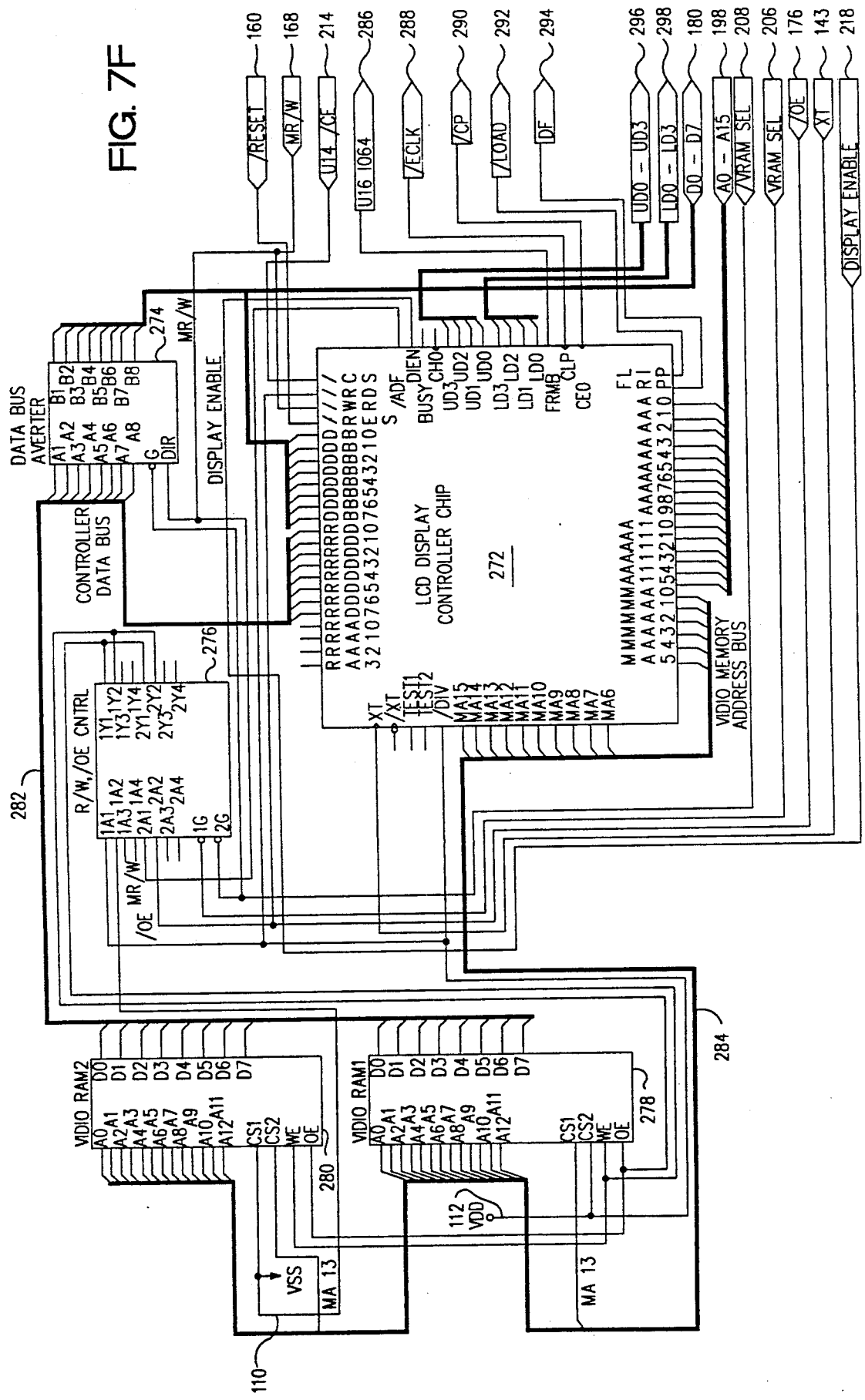
Figure 7H:
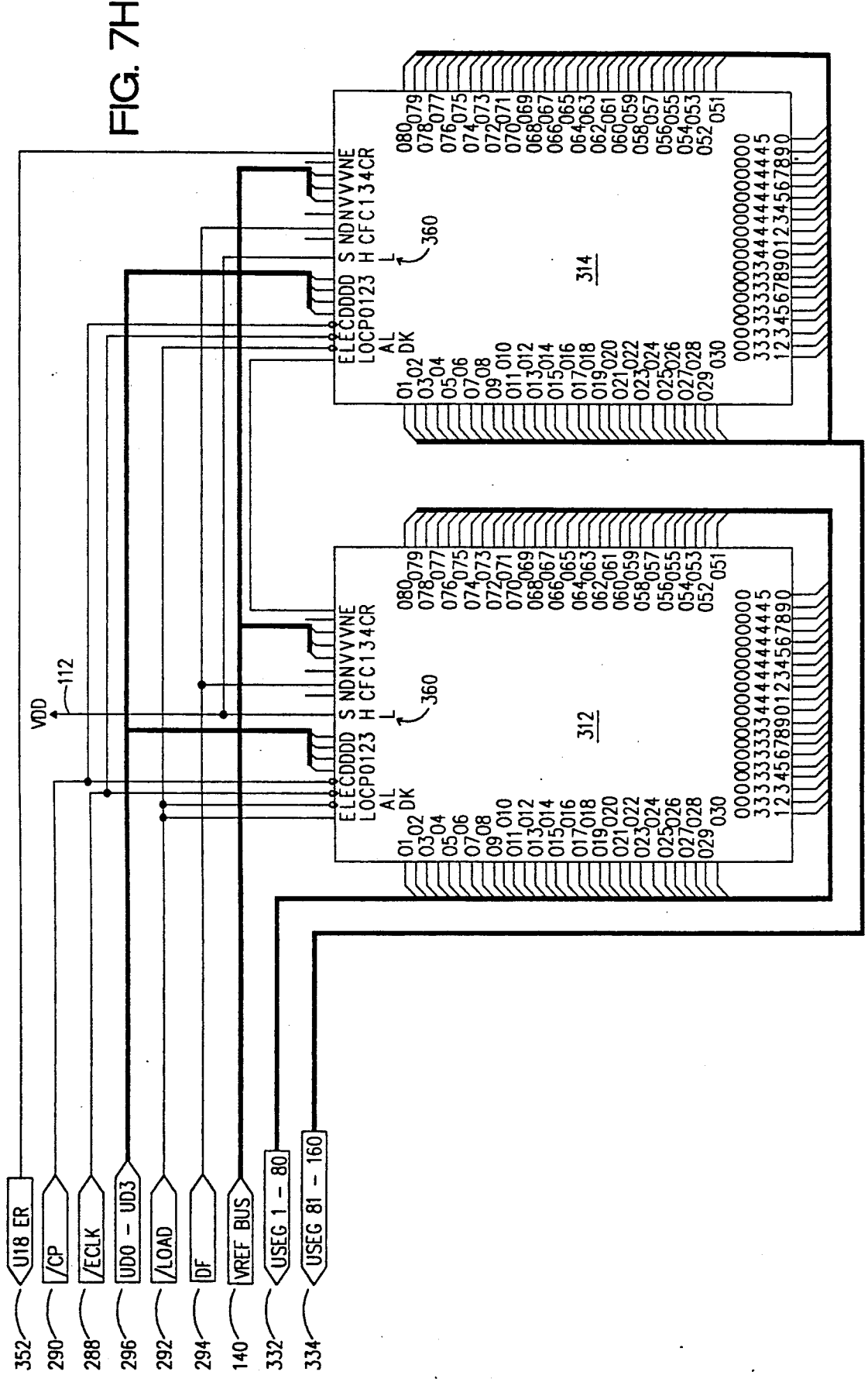
Figure 7J:
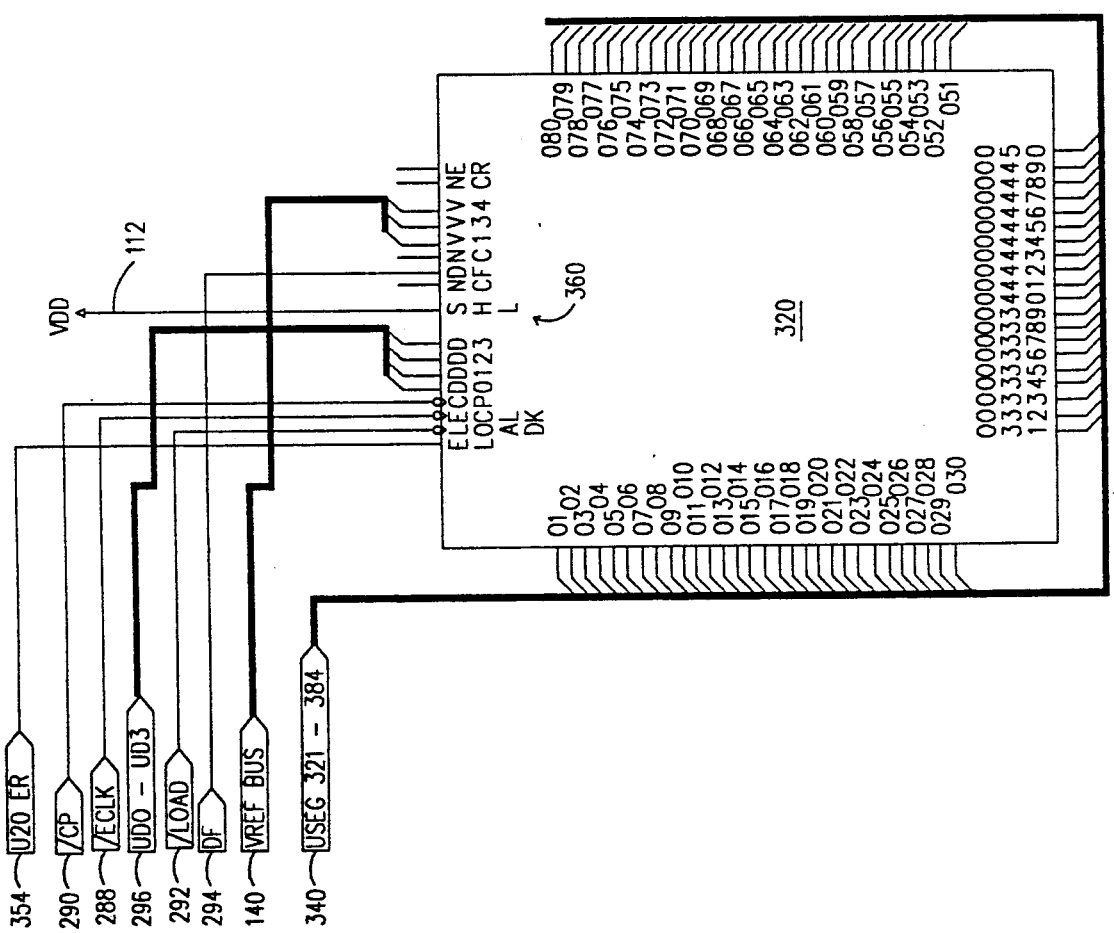
Figure 7L:
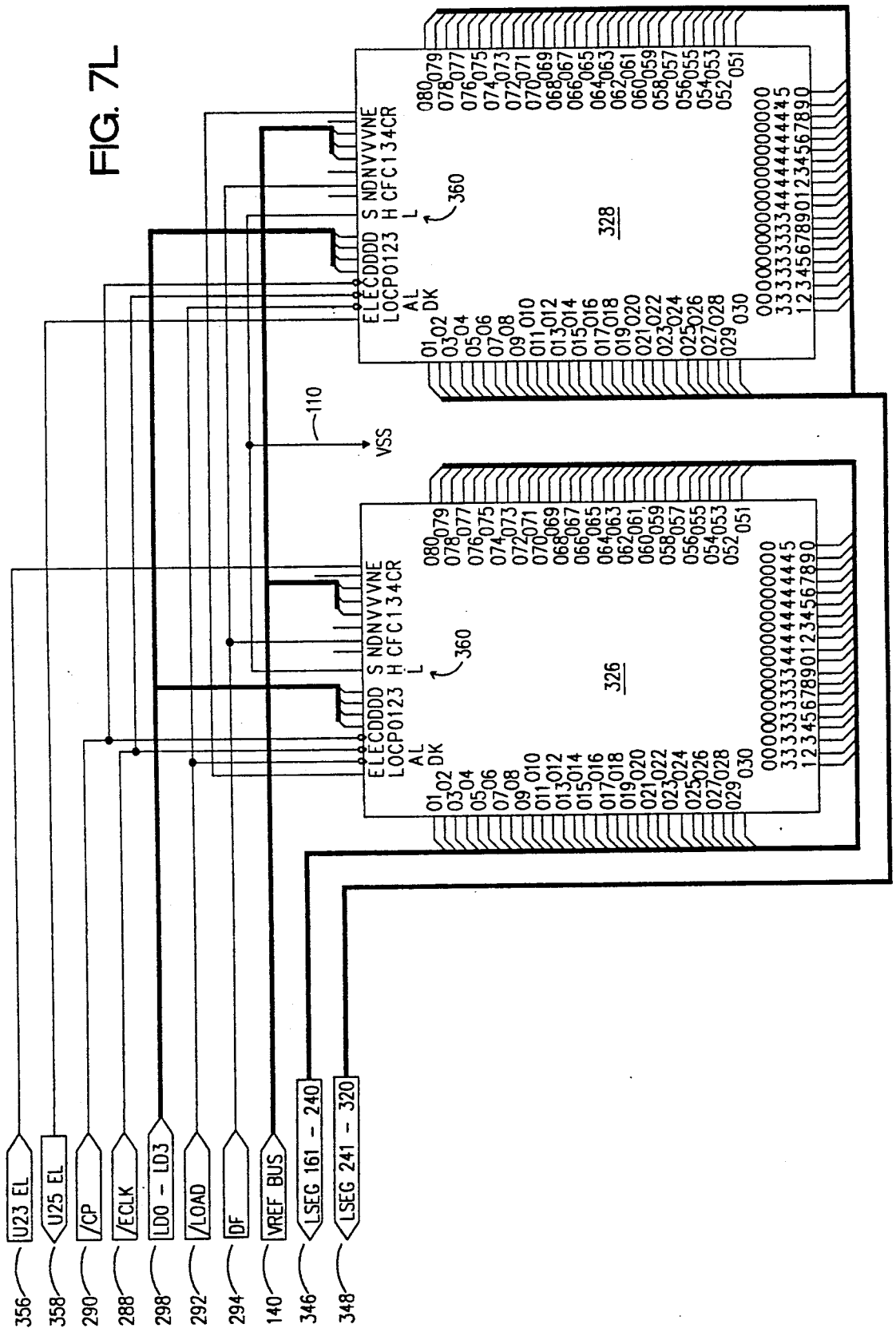
Figure 7M:
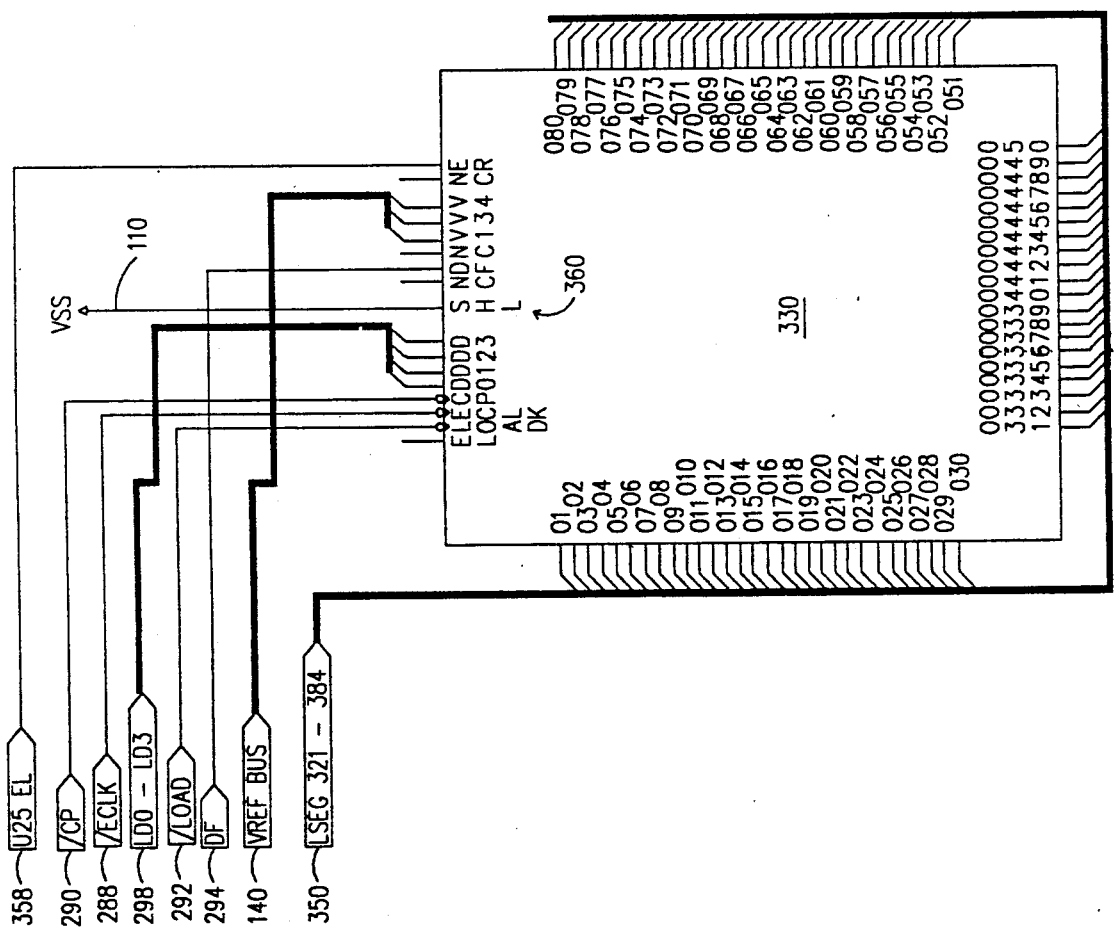

FIG. 7F shows the video memory, well known to those skilled in the art, comprising random access memories (RAMs) 278 and 280, the lower 8K and upper 8K bytes of video memory, respectively, each typically a 6264 RAM, and control logic 276 for the video memory, preferably a 74LS244 integrated circuit, as well as data bus averter 274, typically a 74LS245 transceiver. Data bus averter 274 isolates data bus 180 from video memory data bus 282, and allows LCD controller 272, preferably a MSM6255GS dot matrix LCD controller configured in its graphics mode of operation, manufactured by OKI Semiconductor, to independently access video RAMs 278 and 280 while CPU 142 is using data bus 180, while still allowing CPU 142 to access the video RAMs as required, for proper maintenance of the display; video memory address bus 284 provides for addressing of video RAMs 278 and 280 by LCD controller 272. Signal 218 (DISPLAY ENABLE), generated in FIG. 7C by CPU 142, is used to cause LCD controller 272 to turn the display on or off, as desired. LCD controller 272 interfaces with the rest of the display circuitry in the well known manner using signals 286 (U16 1064), 288 (/ECLK, the enable clock for an active display), 290 (/CP, indicating that the display drivers are to shift the data one position), 292 (/LOAD, causing the display drivers to load the current data on the data bus), and 294 (DF, the data framing signal, causing the counters in all display driver chips to be cleared to zero). The data for the upper section of the display, UD0 through UD3, is bundled into bus 296 (UD0-UD3), and the data for the lower section of the display, LD0 through LD3, is similarly bundled into bus 298 (LD0-LD3), for passage from LCD controller 272 to the display drivers.

FIG. 7G through 7M show the display drivers, using circuits chosen from a compatible family of chips suitable for use with LCD controller 272, all supplied with reference voltages from bus 140 (VREF BUS), generated in FIG. 7A. FIG. 7G shows LCD dot common drivers 300 and 302, each preferably a MSM5278GS LCD driver manufactured by OKI Semiconductor, interfacing with LCD controller 272 in the well known manner. Driver 300 drives rows 1 through 64 of the LCD display, using one signal for each dot, bundled as bus 304 (ROW 1-64), and also drives rows 97 through 160 of the LCD display, using these same 64 signals, bundled as bus 306 (ROW 97-160), multiplexed in time with rows 1 through 64; similarly, driver 302 drives rows 65 through 96 as well as rows 161 through 192 of the LCD display, using 32 signals bundled as bus 308 (ROW 65-96) and bus 310 (ROW 161-192).

FIG. 7H through 7M show the ten LCD dot segment drivers, each preferably a MSM5279GS LCD driver manufactured by OKI Semiconductor, cascaded in the well known manner. Each driver, with the exception of drivers 320 and 330, drives 80 columns of the display, with drivers 320 and 330 driving only 64 columns apiece. The upper portion of the display is driven by drivers 312, 314, 316, 318, and 320, whose signals to the display are bundled as busses 332 (USEG 1-80), 334 (USEG 81-160), 336 (USEG 161-240), 338 (USEG 241-320), and 340 (USEG 321-384), respectively. Similarly, the lower portion of the display is driven by drivers 322, 324, 326, 328, and 330, whose signals to the display are bundled as busses 342 (LSEG 1-80), 344 (LSEG 81-160), 346 (LSEG 161-240), 348(LSEG 241-320), and 350 (LSEG 321-384), respectively. Driver 314 is cascaded with driver 316 by signal 352

(U18 ER), driver 318 is cascaded with driver 320 by signal 354 (U20 ER), driver 324 is cascaded with driver 326 by signal 356 (U23 EL), and driver 328 is cascaded with driver 330 by signal 358 (U25 EL), all in the well known manner. It should be noted that upper segment drivers 332, 334, 336, 338, and 340 shift data from left to right, since input 360 (SHL) is connected to signal 112 (VDD), while the other segment drivers shift data in the opposite direction, avoiding strobing effects upon the display.

FIG. 7N shows the interconnection to LCD display 362, having an upper portion 364 and a lower portion 366. Display 362, well known to those skilled in the art, is preferably a liquid crystal display panel of the "super twist" "low temperature" variety, employing an ultraviolet screen on the front to prevent long term degradation of the display in the sunlight. The display acts as a shutter system in the well known manner, in which dark segments block or absorb the light emitted by LED backlight array 236, while segments that are not dark permit the passage of said light, forming a display pattern on the panel in the well known manner. Display 362 is preferably chosen as shown to have a resolution of 384 dot columns horizontally by 192 dot rows vertically, and, if preferably chosen to have a size similar to that of existing metal license plates, approximately six inches by twelve inches in viewing area, will have a dot resolution of approximately 32 dots per inch. This will allow characters as small as one-half inch in height to be drawn within a matrix of 16 by 11 dots, making even small characters on the license plate display easy to read, with larger characters, such as those in license number viewing area 22 or 22' in FIG. 2 or 5, respectively, having an even larger matrix of dots.

Although the present invention has been described and illustrated with respect to a preferred embodiment and a preferred use therefor, it is not to be so limited since modifications and changes can be made therein which are within the full intended scope of the invention.

I claim:

1. An electronic display license plate for use with a vehicle, comprising:
   (a) electronic display means for displaying license plate information; and,
   (b) configuration means for configuring the display means to correspond to license plate information, said configuration means comprising tailoring means for constraining said configuration means to configure said display means for display of only the particular license plate information corresponding to said vehicle and no other vehicle, said tailoring means being alterable only under the direction of an appropriate authority having responsibility and control for said particular license plate information.

2. An electronic display license plate as recited in claim 1, in which the electronic display means comprises an array of light-emitting diodes.

3. An electronic display license plate as recited in claim 1, in which the electronic display means comprises a liquid crystal display.

4. An electronic display license plate as recited in claim 1, in which the electronic display means comprises an electroluminescent panel.

5. An electronic display license plate for use as an integral part of the taillight assembly of a vehicle, comprising:
   (a) electronic display means for displaying license plate information; and,
   (b) configuration means for configuring the display means to correspond to license plate information, said configuration means comprising tailoring means for constraining said configuration means to configure said display means for display of only the particular license plate information corresponding to said vehicle and no other vehicle, said tailoring means being alterable only under the direction of an appropriate authority having responsibility and control for said particular license plate information.

6. An electronic display license plate as recited in claim 5, in which the electronic display means comprises an array of light-emitting diodes.

7. An electronic display license plate as recited in claim 5, in which the electronic display means comprises a liquid crystal display.

8. An electronic display license plate as recited in claim 5, in which the electronic display means comprises an electroluminescent panel.

9. An electronic display license plate as recited in claims 1, 2, 3, 4, 5, 6, 7, or 8, in which the configuration means comprises a read-only memory circuit.

10. An electronic display license plate for use with a vehicle, comprising:
    (a) electronic display means for displaying license plate information; and,
    (b) configuration means for configuring the display means to correspond to the particular license plate information corresponding to the vehicle, said configuration means comprising:
        i. read-only memory circuit means for containing the particular license plate information; and,
        ii. detection means for detecting the expiration of the particular license plate information,
    said electronic display means comprising control means responsive to said detection means for retrieving the particular license plate information from said read-only circuit means and for causing said display means to indicate the expiration of the particular license plate information.

11. An electronic display license plate for use as an integral part of the taillight assembly of a vehicle, comprising:
    (a) electronic display means for displaying license plate information; and,
    (b) configuration means for configuring the display means to correspond to the particular license plate information corresponding to the vehicle, said configuration means comprising:
        i. read-only memory circuit means for containing the particular license plate information; and,
        ii. detection means for detecting the expiration of the particular license plate information,
    said electronic display means comprising control means responsive to said detection means for retrieving the particular license plate information from said read-only circuit means and for causing said display means to indicate the expiration of the particular license plate information.

12. An electronic display license plate as recited in claims 10 or 11, in which the electronic display means comprises an array of light-emitting diodes.

13. An electronic display license plate as recited in claims 10 or 11, in which the electronic display means comprises a liquid crystal display.

14. An electronic display license plate as recited in claims 10 or 11, in which the electronic display means comprises an electroluminescent panel.

15. An electronic display license plate for use with a vehicle, comprising:
   (a) electronic display means for displaying license plate information; and,
   (b) configuration means for configuring the display means to correspond to the particular license plate information corresponding to the vehicle, said configuration means comprising detection means for detecting the expiration of the particular license plate information, said electronic display means comprising control means responsive to said detection means for causing said display means to indicate the expiration of the particular license plate information.

16. An electronic display license plate for use as an integral part of the taillight assembly of a vehicle, comprising:
   (a) electronic display means for displaying license plate information; and,
   (b) configuration means for configuring the display means to correspond to the particular license plate information corresponding to the vehicle, said configuration means comprising detection means for detecting the expiration of the particular license plate information, said electronic display means comprising control means responsive to said detection means for causing said display means to indicate the expiration of the particular license plate information.

* * * * *